US007223359B2

(12) United States Patent
Torkelson et al.

(10) Patent No.: US 7,223,359 B2
(45) Date of Patent: May 29, 2007

(54) METHOD OF PRODUCING AN EXFOLIATED POLYMER-CLAY NANOCOMPOSITE THROUGH SOLID-STATE SHEAR PULVERIZATION

(75) Inventors: John Torkelson, Skokle, IL (US); Andrew Lebovitz, Des Plaines, IL (US); Kosmas Kasimatis, Chicago, IL (US); Klementina Khait, Skokle, IL (US)

(73) Assignee: Northwestern University, Evanston, IL (US)

( * ) Notice: Subject to any disclaimer, the term of this patent is extended or adjusted under 35 U.S.C. 154(b) by 225 days.

(21) Appl. No.: 10/701,067

(22) Filed: Nov. 5, 2003

(65) Prior Publication Data

US 2005/0096422 A1 May 5, 2005
US 2006/0178465 A9 Aug. 10, 2006

Related U.S. Application Data

(60) Provisional application No. 60/423,591, filed on Nov. 5, 2002.

(51) Int. Cl.
*B29C 47/40* (2006.01)
*C08K 9/06* (2006.01)

(52) U.S. Cl. .............................. 264/211.21; 264/176.1; 523/216; 524/445

(58) Field of Classification Search ................ 524/445; 264/176.1, 211.21; 523/216
See application file for complete search history.

(56) References Cited

U.S. PATENT DOCUMENTS 4,025,643 A * 5/1977 Warner ...................... 514/476

| | | | |
|---|---|---|---|
| 4,650,126 A * | 3/1987 | Feder et al. | 241/22 |
| 5,030,394 A | 7/1991 | Siestes et al. | |
| 5,904,885 A | 5/1999 | Arastoopour et al. | |
| 6,420,047 B2 * | 7/2002 | Winckler et al. | 428/480 |
| 6,500,892 B1 * | 12/2002 | Bishop et al. | 524/445 |
| 2002/0165306 A1 * | 11/2002 | Gilmer et al. | 524/445 |

FOREIGN PATENT DOCUMENTS

| EP | 0 747 322 | 12/1996 |
|---|---|---|
| EP | 1 029 644 A1 | 8/2000 |
| WO | WO 02/11963 A2 | 2/2002 |

OTHER PUBLICATIONS

Lebovitz et al, "Innovative Process for Compatibilizing Polymer Blends and Producing Well-Exfoliated Polymer Nanocomposites: Solid-State Shear Pulverization", PMSE Preprints, 88, pp. 96-97.*
Lebovitz et al, "Innovative Process for Compatibilizing Polymer Blends and Producing Well-Exfoliated Polymer Nanocomposites: Solid State Shear Pulverization", Abstracts of Papers, 225th ACS National Meeting, New Orleans, LA, Mar. 23-27, 2003.*
Lewis, Richard J., Sr., ed. Hawley's Condensed Chemical Dictionary, 2002.*
Pinnavaia, T. J. and Beall, G. W., eds. Polymer-Clay Nanocomposites, Chichester, John Wiley & Sons, Ltd. 2000, Preface.*

* cited by examiner

*Primary Examiner*—Vasu Jagannathan
*Assistant Examiner*—Vickey Ronesi
(74) *Attorney, Agent, or Firm*—Berenato, White & Stavish

(57) ABSTRACT

A method of producing a polymer-clay nanocomposite comprises providing a supply of polymer-clay mixture, exfoliating the mixture through solid-state shear pulverization in the presence of cooling sufficient to maintain the extruded mixture in the solid state during the pulverization, and discharging the resulting exfoliated mixture. The invention is also directed to a method of producing a polymer hybrid nanocomposite, wherein a component is dispersed throughout a polymer matrix by solid-state shear pulverization of a polymer mixed with the second component.

16 Claims, 5 Drawing Sheets

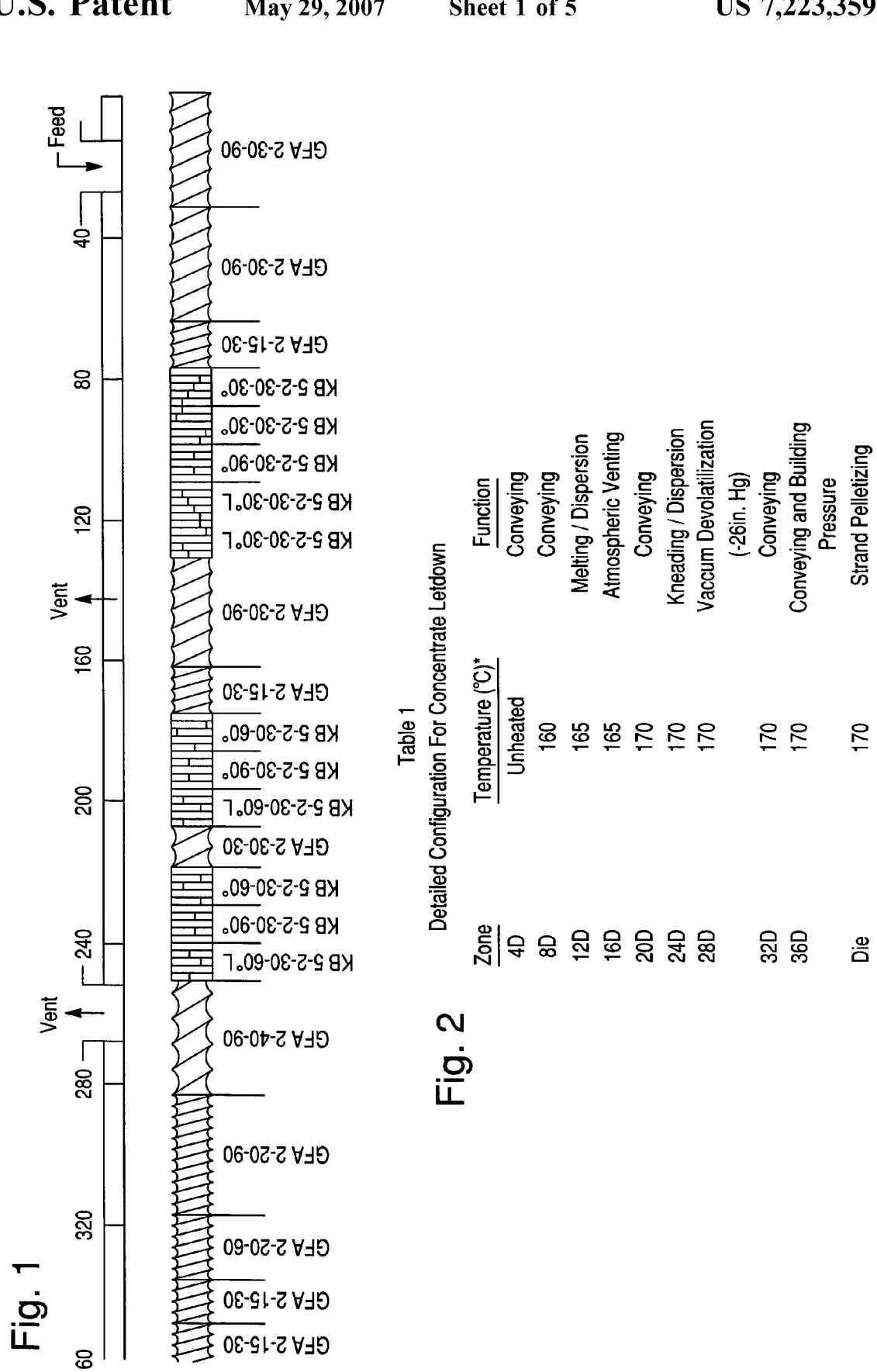

METHOD OF PRODUCING AN EXFOLIATED POLYMER-CLAY NANOCOMPOSITE THROUGH SOLID-STATE SHEAR PULVERIZATION

This application claims the benefit of priority of U.S. Provisional Application No. 60/423,591 filed in the United States Patent Office on Nov. 5, 2002.

STATEMENT REGARDING FEDERALLY SPONSORED RESEARCH

This invention was made with government support under Grant No. DMR-0076097 awarded by the National Science Foundation.

FIELD OF THE INVENTION

The present invention is directed to a method of producing an exfoliated polymer-clay nanocomposite. A polymer-clay mixture is provided, and exfoliated through solid-state shear pulverization in the presence of cooling sufficient to maintain the mixture in the solid state during the pulverization. Preferably, the mixture is first melt-extruded. The invention is also directed to polymer-clay nanocomposites produced therefrom.

BACKGROUND OF THE INVENTION

The subject of polymer hybrid composites based on layered inorganic compounds such as clays has been the subject of intense industrial and academic study for more than a decade. Polymer materials may be filled with several inorganic, synthetic and/or natural minerals in order to increase properties like heat resistance, mechanical strength and impact resistance. However, there is little or no interaction between the two mixed components. In order to increase interaction between the polymer and reinforcing material, the dimensions of the reinforcing elements on a molecular level must be decreased.

Layered silicates or clays are one material class of reinforcing elements on a nano-scale. Such elements have dimensions of the order of one billionth of a meter, or one nanometer. Such a composite is called a nanocomposite. There are many types of nanocomposites, whereby the defining characteristic is that the reinforcing component has the dimensions mentioned above.

The most heavily researched type of nanocomposite uses layered mineral clays as the reinforcing component. Polymer-clay nanocomposite materials have attracted a great deal of attention because they provide enhanced mechanical and thermal properties as compared to conventional materials. Specifically, these hybrid composites exhibit increased tensile strength, modulus, and heat distortion resistance, as compared with a pure polymer. The composites also have lower water sensitivity, reduced permeability to gases, and a similar thermal coefficient of expansion. Further, it has been found that nanocomposites impart a level of flame retardance and UV resistance not present in the pure polymer component. Because of these enhanced properties, such nanocomposites are useful in the electronics, automobile, aircraft, and aerospace industries, among others.

The type of clay, the purity of the clay, and the choice of clay pre-treatment are all controllable variables that influence the nature and properties of the final nanocomposite. Many clays are aluminosilicates, which have a sheet-like or layered structure, and consist of silica $SiO_4$ tetrahedra bonded to alumina $AlO_6$ octahedra in a variety of ways. A 2:1 ratio of the tetrahedra to the octahedra results in smectite clays, the most common of which is montmorillonite. Smectite clays are clays that can be swollen with small molecules. Other metals such as magnesium may replace the aluminum in the crystal structure.

Montmorillonite clay is the most common type of clay used for nanocomposite formation. Montmorillonite naturally forms stacks of plate-like structures, or platelets. Each platelet is less than 10 Angstroms thick, but over 200 times that in width. The spaces between these platelets are called gallery spaces. Each platelet is composed of silicon oxide and aluminum oxide. Under the proper conditions, the gallery spaces can be swollen and filled with monomer, oligomer, or polymer. Specifically, a swelling of the gallery spaces increases the distance between platelets in the stacks. Clay platelets swollen with polymer are said to be intercalated. If the clay swells so much that it is no longer organized into stacks, it is said to be completely exfoliated.

In addition to montmorillonite clay, other types of clay may also be used, including hectorites, which contain very small platelets, and synthetic clays. Synthetic clays can be produced in a very pure form and can carry a positive charge on the platelets, in contrast to the negative charge found in montmorillonites.

Depending on the precise chemical composition of the clay, the layers generally bear a charge on the surface and edges of the platelets. This charge is balanced by counterions, which reside in part in the gallery spaces between the layers. Thus, the stacks of clay platelets are held tightly together by electrostatic forces. Because of the charged nature of pure clay, the clay is generally highly hydrophilic. For example, montmorillonite is naturally hydrophillic. This makes pure clay poorly suited to mixing and interacting with most polymer matrices. As such, a necessary prerequisite for successful formation of polymer-clay nanocomposites is the alteration of the clay polarity to make the clay organophilic. An organophilic clay can be produced from a normally hydrophilic clay by ion exchange with an organic cation such as an alkylammonium ion. The particular pre-treatment process used may have an effect on the formation of the nanocomposite product formed. Such pre-treatment processes are well known in the art.

As noted above, a nanocomposite may be in the form of an intercalated or exfoliated hybrid. In an intercalate hybrid, the polymer component is inserted between the clay layers or platelets such that the gallery spaces are expanded, but the platelets still bear a well-defined spatial relationship to each other. In an exfoliated hybrid, the layers or platelets comprising the clay stacks have been completely separated and the individual platelets are distributed throughout the polymer matrix. Various factors affect this delamination of the clay stacks, including the exchange capacity of the clay, the polarity of the reaction medium and the chemical nature of the interlayer cations (e.g. onium ions).

Levels of exfoliation may be determined by an x-ray scattering test. An absence of scattering peaks at a characteristic scattering angle indicates high levels of exfoliation. Conversely, a large scattering peak indicates decreased (or poor) exfoliation. The scattering angle is inversely correlated with interlayer or gallery spacing. Specifically, scattering angle (theta) is linearly proportional to 1/d, where d equals interlayer spacing. Therefore, the level of exfoliation is measured by analyzing the level of scattering intensity at the expected scattering angle (based on the interlayer spacing). Thus, the interlayer or gallery spacing is a function of the particular clay. Complete exfoliation, wherein all stacks are delaminated into single platelets surrounded by polymer, may not be required to attain optimal nanocomposite properties. However, substantial exfoliation is generally desired in order to attain the above noted enhanced properties in the resulting product. Substantial or high levels of exfoliation is defined herein as an exfoliation level that lacks any significant scattering peak in an x-ray scattering test.

In addition to an x-ray scattering test, electron microscopy can provide a pictorial perspective of the exfoliation level in a nanocomposite. However, it is does not provide as quantitative a measure of the exfoliation level of the entire sample compared to an x-ray scattering test. Dispersion of the clay or other reinforcing material throughout the polymer matrix may also be seen with electron microscopy. Generally, a consistent dispersal of the reinforcing material is desirable, wherein the reinforcing material is not clumped in certain areas of the matrix.

Various attempts have been made to produce a substantially exfoliated nanocomposite. The most successful method has been in situ polymerization, wherein a monomer is polymerized in situ to give the corresponding polymer-clay nanocomposite. In the late 1980's and early 1990's, researchers from Toyota™'s Central Research and Development Laboratories demonstrated an in situ polymerization method of monomer to nylon, producing nylon-6 (a clay-nylon hybrid). Montmorillonite clay was exchanged with an acid, replacing the cations on the clay surface and swelling the clay. The modified clay was dispersed in the polar monomer, epsilon-caprolactam, which was then polymerized into the polymer commonly known as nylon-6.

Such in situ polymerization methods rely on chemical processes to achieve the desired exfoliated product, and there success has been limited. A polar monomer can intercalate between clay sheets, and polymerization leads to exfoliation. However, these chemical methods have not been successful for other polymer components, particularly nonpolar polymers. Certain polymers, such as polypropylene, require a much more complicated synthetic approach than other monomers, such as those involved in producing nylon-6. As such, polypropylene nanocomposites, or other such polymers, have not been produced by in situ polymerization (i.e. polymerizing propylene in the presence of clay).

Attempts to produce well-exfoliated polymer-clay nanocomposites by non-chemical methods (e.g. melt blending or solution blending of polymer-clay systems) have not been successful. Twin-screw extrusion of polymer-clay mixtures has not yielded well-exfoliated clays in the polymer, though it has resulted in relatively good polymer-clay contact. Twin-screw extrusion, or melt extrusion, is well known in the art, wherein a mixture or compound is processed through a twin-screw extruder or compounder, or an intensive mixer, such as a Farrel Continuous Mixer™.

In addition to melt-extrusion, the method of solid-state shear pulverization has been developed for preparing polymer materials, as disclosed in U.S. Pat. No. 5,814,673 to Khait and U.S. Pat. No. 6,180,685 also to Khait, the disclosures of which are incorporated herein by reference. As disclosed in the Khait patents, a chemical change to a polymer material is effected by application of mechanical energy through solid-state shear pulverization in the presence of cooling sufficient to maintain the material in the solid state during pulverization. However, the Khait patents do not disclose or suggest a method of producing highly exfoliated polymer-clay nanocomposites.

The present invention is directed to a method of producing highly exfoliated polymer-clay nanocomposites through a non-chemical process, whereby the resulting product exhibits a high level of exfoliation and dispersion. The polymer-clay nanocomposites produced therefrom may be used in a wide variety of applications, including barrier films for reduced permeability, and applications requiring a polymer with improved solvent resistance, reduced flammability, increased strength and/or hardness, light weight, and resistance to heat distortion. Industrial applications for such nanocomposites include, inter alia, the automotive, aircraft and aerospace industries.

SUMMARY OF THE INVENTION

The present invention is directed to a method of producing a polymer-clay nanocomposite, comprising the steps of: providing a supply of polymer-clay mixture; exfoliating the mixture through solid-state shear pulverization in the presence of cooling sufficient to maintain the extruded mixture in the solid state during the pulverization; and discharging the resulting exfoliated mixture.

The invention is also directed to a polymer-clay nanocomposite produced therefrom. The nanocomposite comprises a nonpolar polymer material and at least about 3% highly exfoliated organoclay.

The invention also relates to a method of producing a polymer hybrid nanocomposite, comprising the steps of: providing a supply of polymer material; mixing the polymer material with a second component to form a mixture; effecting a high level of dispersion of the second component throughout the mixture through solid-state shear pulverization in the presence of cooling sufficient to maintain the mixture in the solid state during the pulverization; and discharging the resulting mixture.

BRIEF DESCRIPTION OF THE FIGURES

FIG. 1 is a schematic diagram showing a configuration for screw elements of a twin-screw extruder;

FIG. 2 is a table of temperatures and functions of zones corresponding to FIG. 1;

DETAILED DESCRIPTION OF THE INVENTION

A method of exfoliation in a polymer-clay nanocomposite is provided. A polymer-clay mixture is exfoliated through solid-state shear pulverization in the presence of cooling sufficient to maintain the extruded mixture in the solid state during the pulverization. Preferably, the polymer-clay mixture is first melt-extruded before solid-state shear pulverization.

The disclosed process is particular useful for nonpolar polymers, such as polypropylene and polyolefins, though the disclosed process may be applied to any polymer-reinforcing component mixture. If a nonpolar polymer is used, an organically modified clay is generally required, such as modified clays manufactured by Nanocor™ and Southern Clay Products™, in order to reduce the insoluble nature of the clay with the polymer.

The present invention is best explained by way of the following example:

EXAMPLE 1

A mixture of polypropylene-organoclay was provided, comprising about 90% polypropylene and about 10% organoclay. The organoclay was obtained from Nanocor™, and contained about 40–50% clay content and about 50–60% organic content. Specifically, Nanocor.™.C.30P clay was used, which is a montmorillonite nanoclay in de-agglomerated form. (Physical properties of C.30P: 40–50% nanoclay content; 38–42 lb./ft.3 bulk density; 0.2% max. moisture). All percentages reported herein are based on weight percentage, unless expressly stated otherwise.

Samples of 90/10 wt % polypropylene-organoclay mixture were processed as follows: 1) sample A was processed by twin-screw melt extrusion (1 pass); 2) sample B was processed by twin-screw melt extrusion followed by a second twin-screw melt extrusion (2 passes); 3) samples C and D were processed by solid-state shear pulverization, using two different screw element configurations; and 4) sample E was processed by twin-screw melt extrusion followed by solid-state shear pulverization.

Processing parameters for the twin-screw extruder were the same for all samples tested. Standard extrusion parameters were selected, as suggested by Nanocor™ for extruding polymer alone, or mixing polymer blends. Specifically, standard screw element configuration are best shown in FIGS. 1 and 2.

Standard processing parameters for solid-state shear pulverization, for processing polypropylene, were also selected. A 25-millimeter diameter twin-screw pulverizer was used. The barrels were cooled to about 10° Celsius to maintain the polymer in the semi-crystalline state during pulverization.

Figure 3:
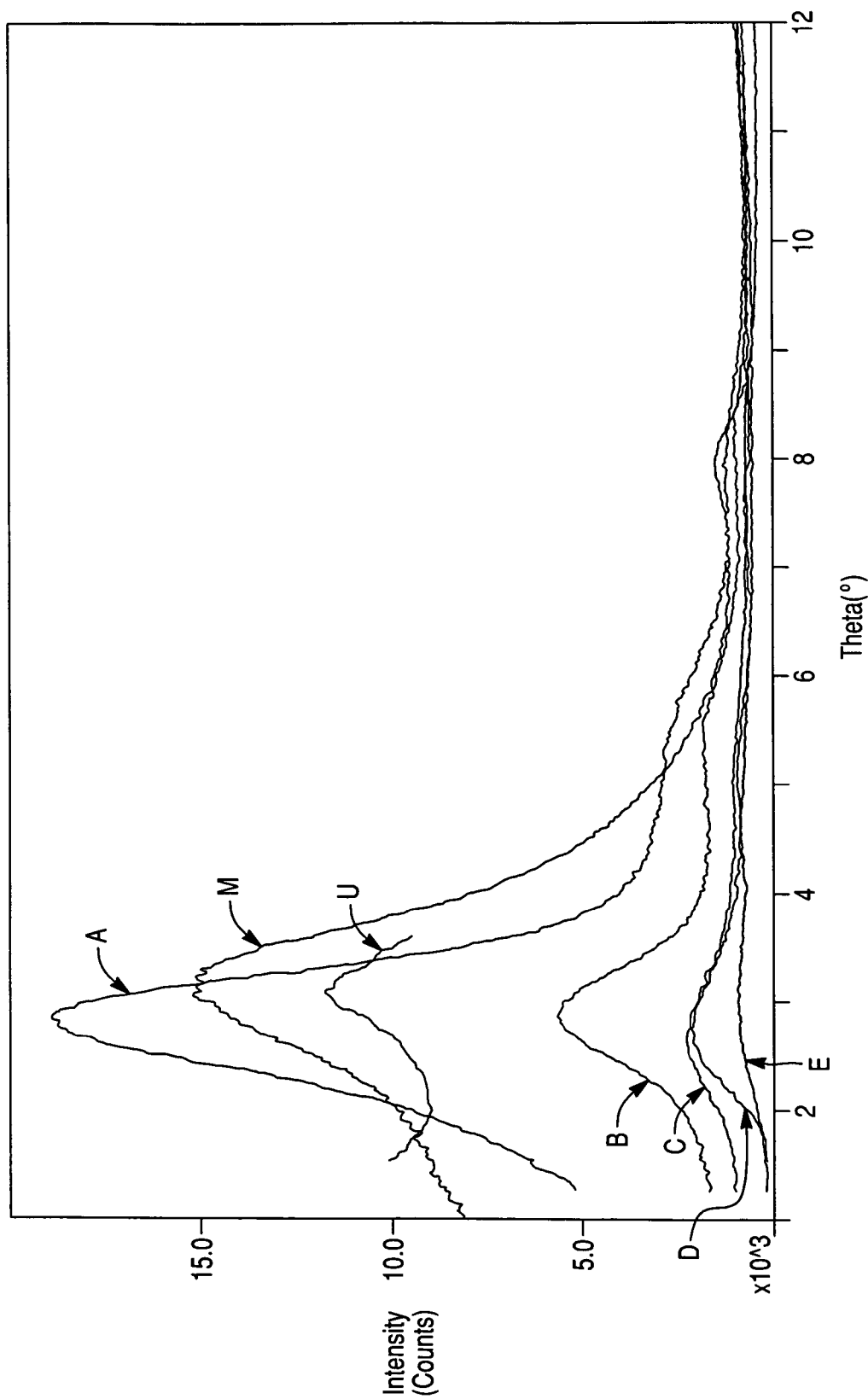
FIG. 3 is a graph showing data results from an x-ray scattering test for various samples.
Figure 4:
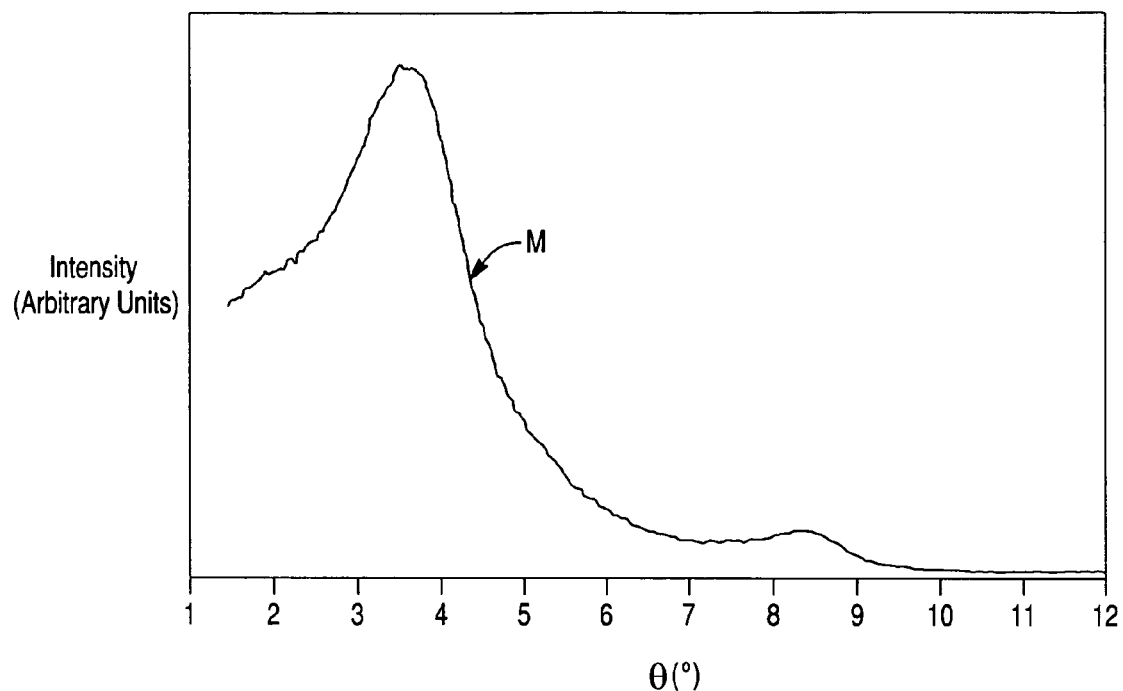
FIG. 4 is a graph showing data results from an x-ray scattering test for unprocessed organoclay sample M from FIG. 3.
Figure 5:
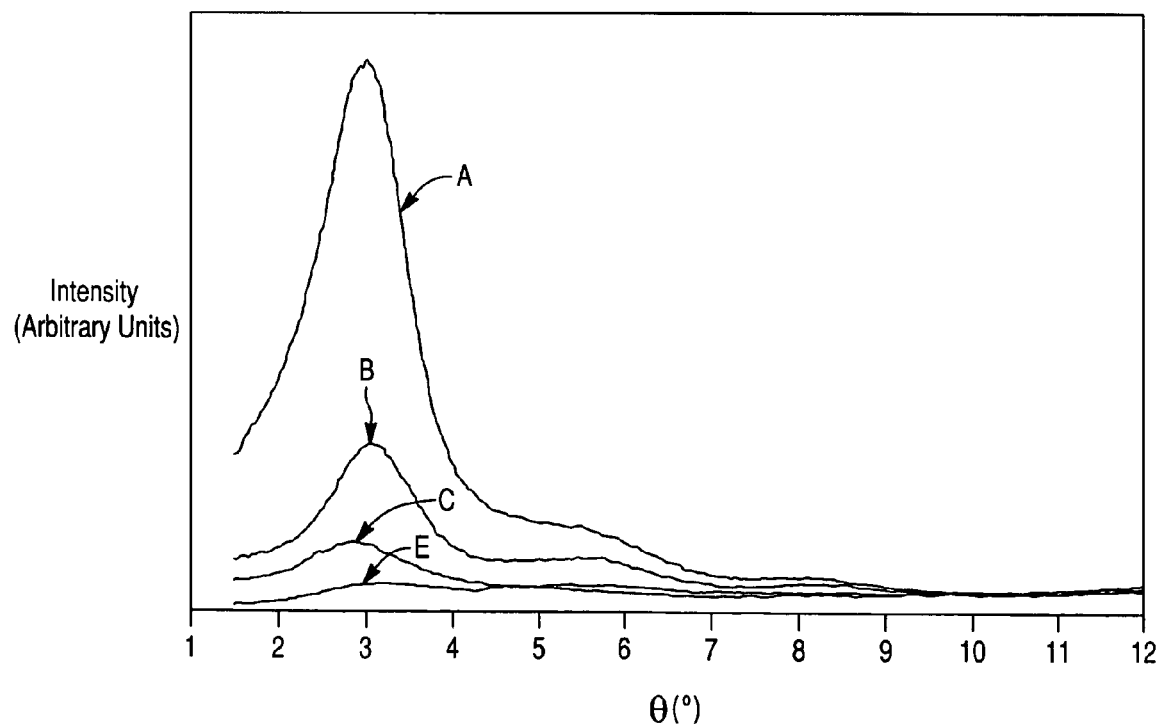
FIG. 5 is another graph showing data results for some samples shown in FIG. 3.

As best shown in FIGS. 3–5, relative levels of exfoliation in the resulting nanocomposites were then compared by x-ray scattering testing. Scattering intensity was graphed on the y-axis, and correlated to scattering angle on the x-axis. Scattering peaks are observed in poorly exfoliated samples at a scattering angle of about 3 degrees, which is quantitatively related to the interlayer distance between the layers of organoclay sheets that were not exfoliated. Peak intensity decreases with an increasing degree of exfoliation. The organoclay used in this example had an interlayer distance of about 26 to 30 Angstroms. Therefore, the scattering angle may vary depending on the specific properties of the particular clay used, as noted above. The scattering peak of the Nanocor™ C.30P organoclay masterbatch M, without any mixing with polypropylene, is just under 15,000 counts scattering intensity, as best shown in FIGS. 3–4. A sharp peak is present at a scattering angle of between about 3–4 degrees in masterbatch M, which indicates a high level of gallery spacing regularity. (The approximate interlayer spacing distance is therefore approximately 2.5 nm). The scattering peak of the unmodified clay U (i.e. without any organic content) used by Nanocor™ to produce the masterbatch of organoclay is more than 10,000 counts scattering intensity, as best shown in FIG. 3. The scattering intensity near 3 degrees of samples M and U indicates a high level of spacing regularity, with the clay sheets having a consistent layering distance from each other of about 26 to 30 Angstroms.

With respect to the polypropylene-clay nanocomposites, the highest level of exfoliation was achieved in sample E, which was melt-extruded once followed by solid-state shear pulverization, as best shown in FIGS. 3 and 5. No significant scattering peak is displayed in sample E. The lack of any significant intensity peak is an indication that the vast majority of the original, spaced interlayer clay sheets are exfoliated into single sheets or a very small number of layered sheets. Thus, a high level of exfoliation was achieved in sample E. Levels of exfoliation were slightly lower for samples C and D, which were processed by solid-state shear pulverization using two different screw element configurations. Only slight scattering peaks are displayed in samples C and D, which have comparable levels of exfoliation. Levels of exfoliation were much lower for samples A and B, which were melt-extruded once (1 pass), and melt-extruded twice (2 passes), respectively. The reduction in peak intensity, from sample A to sample E, is related in part to a reduction in the fraction of clay sheets that were not exfoliated, which maintain a close and uniform interlayer spacing.

The use of melt-state processing alone (as in samples A and B) does not yield a highly exfoliated nanocomposite system compared to the samples C, D and E, as demonstrated in FIGS. 3 and 5. Solid-state shear pulverization alone yields significantly better exfoliation and dispersion than the use of twin-screw melt extrusion, and a high level of exfoliation is achieved when the polymer-clay mixture is first mixed by twin-screw extrusion followed by solid-state shear pulverization.

Figure 6:
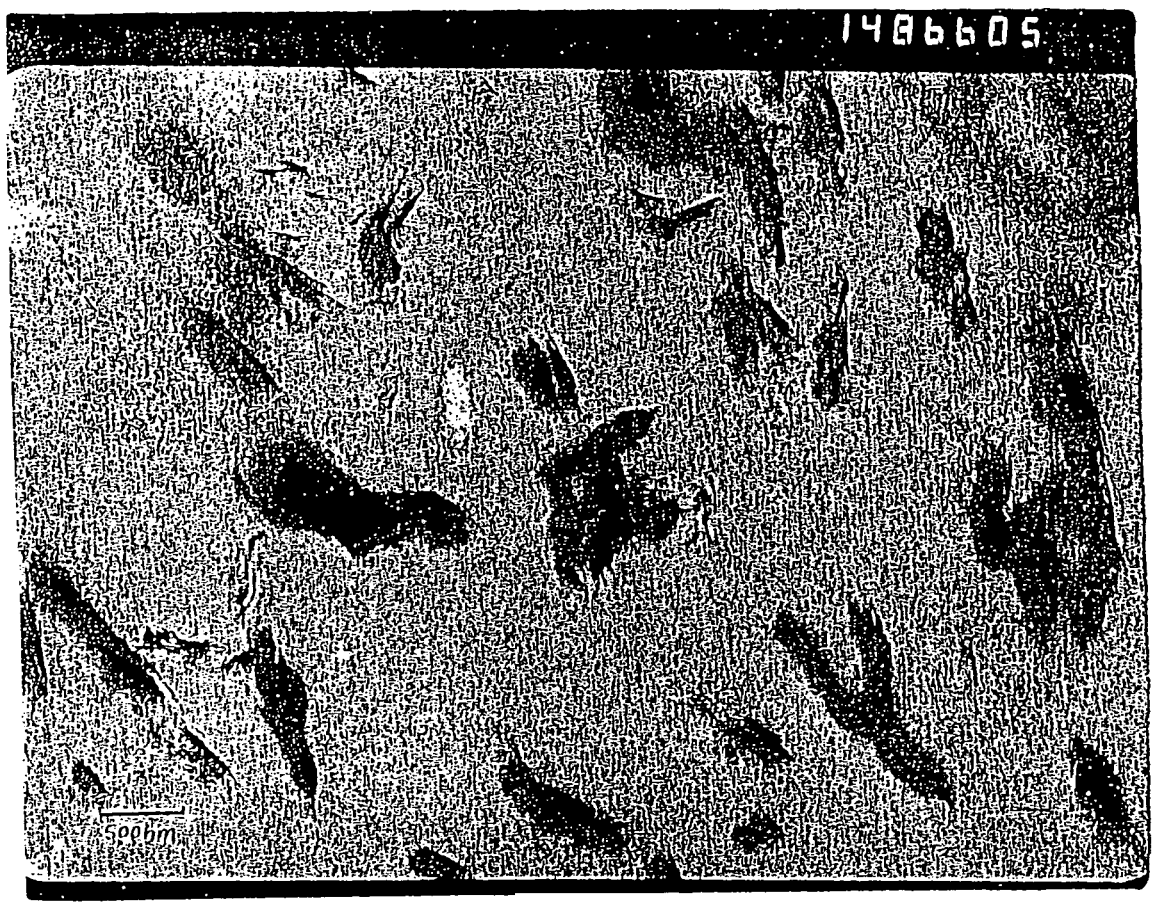
FIG. 6 is an electron microscopy image of a sample of polymer-organoclay mixture that was processed by two passes of melt-extrusion.

Pictorial perspectives of exfoliation and dispersion of sample B is best shown in FIG. 6. FIG. 6 is an electron microscopy image of sample B, which was processed twice through a twin-screw extruder. The micrograph shows the size of the remaining clay sheets that were not exfoliated, as well as dispersion of clay in a portion of sample B, as darker areas on the image. In sample B, the dark areas indicate that the layered clay sheets, or clumps, have not undergone substantial exfoliation or dispersion. The clumps are typically about 100 to several hundred nanometers in length and about 50 to 400 nm in width. Given a typical interlayer spacing of about 2.5nm, the image indicates that the clumps have at the low end bout 15 to 20 layers of unexfoliated clay sheets and at the high end about 140 to 150 layers of unexfoliated clay sheets.

Figure 7:
FIG. 7 is an electron microscopy image of a sample of polymer-organoclay mixture that was processed according to the disclosed method.

In contrast, sample E, which was processed by melt-extrusion followed by solid-state shear pulverization, shows fewer darker portions, as best shown in FIG. 7. The clumps are of about 50 to 200 nm in length, and some single or double clay sheets are evident. The widest clump is about 12 sheets. Sample E is not as heavily layered (or clumped) as sample B. This is indicative of substantial exfoliation and excellent dispersion, which further supports the results shown by the x-ray scattering test in FIGS. 3 and 5.

Therefore, the method comprising an initial melt-extrusion step followed by solid-state shear pulverization achieves the highest level of exfoliation. The initial melt-extrusion step thoroughly mixes the polymer-clay mixture, yielding an intimate contact of polymer and clay. After the mixture is thoroughly mixed (but not yet exfoliated), solid-state shear pulverization yields a high level of exfoliation and dispersion.

In addition to polypropylene, other polymers may be used in the mixture system of the present invention, including: polyolefins such as polyethylene and copolymers of propylene and ethylene; polystyrene and polymethacrylates, or blends of these polymers with polyolefins; copolymers such as poly(ethylene-co-vinyl acetate); polyhydroxystyrene, poly (vinyl pyridine), polyvinylalcohol, polyacrylamide, polycaprolactone, copolymers of ethylene and acetate, and the like; and condensation-type polymers such as poly (ethylene terephthaltate), commonly known as polyester, and nylon. These polymers are incorporated into the polymer-clay mixture as described for the polypropylene-organoolay mixture. Therefore, all parameters described above are applicable to these other polymers. Similar levels of exfoliation and dispersion are achieved with these polymers.

Other clay compositions may be used with the present invention. Specifically, Nanocor™ formulates various clay compositions for creating polymer nanocomposites, including C.30P, C.44PA, C.44TPO, C.30EVA, and C.30PE. In addition, other clay system may be used, such as those manufactured by Southern Clay Products™. It will be understood by those skilled in the art that other comparable clays may be used in the present invention.

Other mixture percentages between polymer and clay may also be used depending on the desired properties of the nanocomposite. For example, a mixture of polypropylene-organoclay may be provided comprising about 97% polypropylene and about 3% organoclay content. Alternatively, a mixture of polypropylene-organoclay may be providing comprising about 93% polypropylene and about 7% wt. organoclay content. Generally, a maximum organoclay content of about 10% wt. is preferred, more preferably about 5% wt. (Nanocor™ suggests that its organoclays be added to polymer at a 5–12% organoclay content (i.e. 2.5–6% clay content and 2.5–6% organic content). A clay content of more than 12% wt. would generally be undesirable given the advantages of polymer nanocomposites provides for synergistic properties at low non-polymer additive content.

Processing parameters and screw element configuration for twin-screw melt extrusion may also vary, so long as the non-mixed polymer alone may be melt processed with the selected parameters. For example, polypropylene has a melt temperature of about 165° Celsius. Therefore, the polypropylene must be melt processed at temperatures exceeding 165° C., as noted in FIG. 2 (note that initial conveying functions at zones 4D and 8D may be performed below 165 C.). It is understood by one skilled in the art, however, that processing parameters would not include an excessively high temperature that causes degradation during processing. For example, a temperature of 300 C. would not be selected for melt processing polypropylene.

Processing parameters for screw element configuration of the twin-screw pulverizer for solid-state shear pulverization may also vary. Specifically, screw element configurations set forth in the above noted Khait patents are applicable to the present invention.

The disclosed method is applicable to a variety of polymer-organoclay systems, as noted above, as well as mixture percentages of polymer to organoclay. Regardless of the selected polymer-organoclay mixture, high levels of exfoliation and dispersion are achieved by processing the mixture according to the disclosed method of solid-state shear pulverization. Preferably, the mixture is melt-extruded before the solid-state shear pulverization. High levels of exfoliation and dispersion have been achieved for nonpolar polymers, such as polypropylene, as well as polyolefins. Similar levels of exfoliation for such polymers have not been achieved by prior methods, including non-pulverization methods (i.e. chemical methods such as in situ polymerization).

The disclosed method may also be applicable to the other reinforcing components aside from clay. For example, excellent levels of dispersion are achieved for the following: polymer-metal nanoparticle mixture for high levels of dispersion (metal nanoparticles are not exfoliated, as described herein); polymer-carbon nanofibers and polymer-carbon nanotube nanocomposites for high levels of dispersion; silicate nanoparticles; and cellulose nanowhiskers. Excellent levels of dispersion, wherein the reinforcing component is evenly distributed throughout the polymer matrix, are achieved by processing these polymer-reinforcing component mixtures to form polymer hybrid nanocomposites.

It will be apparent to one of ordinary skill in the art that various modifications and variations can be made in construction or configuration of the present invention without departing from the scope or spirit of the invention. Thus, it is intended that the present invention cover all modifications and variations of the invention, provided they come within the scope of the following claims and their equivalents.

We claim:

1. A method of producing a polymer-clay nanocomposite, comprising the steps of:
   providing a polymer-clay mixture comprising a polymer and clay;
   exfoliating the clay through solid-state shear pulverization in a twin-screw pulverizer and in the presence of cooling sufficient to maintain the mixture in the solid state during the pulverization; and
   discharging the mixture as a polymer-clay nanocomposite containing the exfoliated clay.

2. The method of claim 1, wherein the mixture comprises at least about 3 wt % organoclay.

3. The method of claim 1, wherein the mixture comprises about 10 wt % organoclay.

4. The method of claim 3, wherein the organoclay contains between about 40–50 wt % clay and between about 50–60 wt % organic content.

5. The method of claim 4, wherein the organoclay is a montmorillonite.

6. The method of claim 1, wherein the polymer-clay mixture comprises a polymer selected from the group consisting of polypropylene, polyolefins, polystyrene, polymethacrylates, poly(ethylene-co-vinyl acetate), polyhydroxystyrene, poly (vinyl pyridine), polyvinylalcohol, polyacrylamide, polycaprolactone, copolymers of ethylene, copolymers of propylene, copolymers of acetate, poly (ethylene terephthalate), nylon, and blends thereof.

7. The method of claim 1, further comprising a step of cooling a pulverizer barrel with a chilled fluid to about 10° Celsius during the pulverization.

8. The method of claim 1, wherein the clay comprises an organoclay, and wherein the polymer comprises a nonpolar polymer.

9. A method of producing a polymer-clay nanocomposite, comprising the steps of:
   melt extruding a polymer-clay mixture comprising a polymer and clay;
   exfoliating the clay through solid-state shear pulverization in a twin-screw pulverizer and in the presence of cooling sufficient to maintain the mixture in the solid state during the pulverization; and
   discharging the mixture as a polymer-clay nanocomposite containing the exfoliated clay.

10. The method of claim 9, wherein the mixture comprises at least about 3 wt % organoclay.

11. The method of claim 10, wherein the organoclay contains between about 40–50 wt % clay and between about 50–60 wt % organic content.

12. The method of claim 11, wherein the organoclay is a montmorillonite.

13. The method of claim 9, wherein the mixture comprises about 10 wt % organoclay.

14. The method of claim 9, wherein the polymer-clay mixture comprises a polymer selected from the group consisting of polypropylene, polyolefins, polystyrene, polymethacrylates, poly(ethylene-co-vinyl acetate), polyhydroxystyrene, poly (vinyl pyridine), polyvinylalcohol, polyacrylamide, polycaprolactone, copolymers of ethylene, copolymers of propylene, copolymers of acetate, poly (ethylene terephthalate), nylon, and blends thereof.

15. The method of claim 9, further comprising a step of cooling a pulverizer barrel with a chilled fluid to about 10° Celsius during the pulverization.

16. The method of claim 9, wherein the clay comprises an organoclay, and wherein the polymer comprises a nonpolar polymer.

\* \* \* \* \*